L. O. DRAKE.
GEARING FOR SEEDERS.
APPLICATION FILED SEPT. 5, 1917.
1,321,293.
Patented Nov. 11, 1919.
2 SHEETS—SHEET 1.
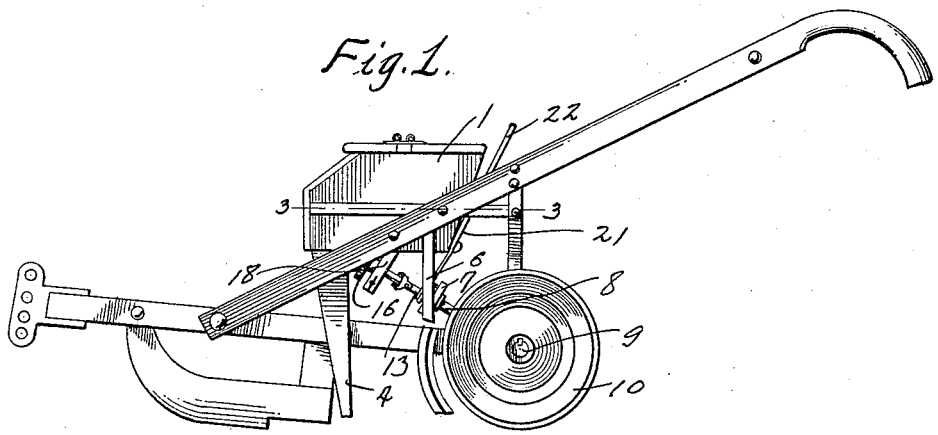
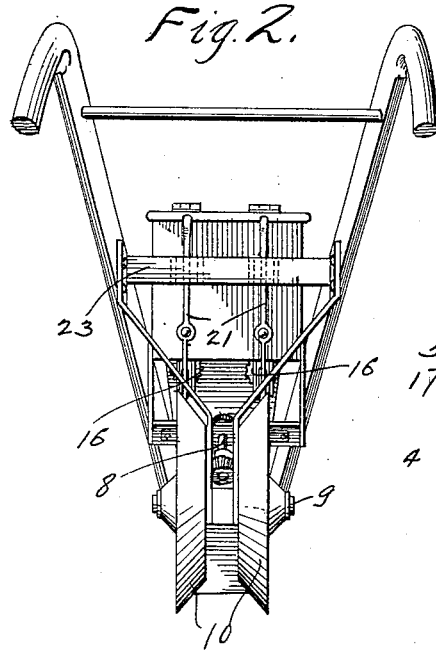
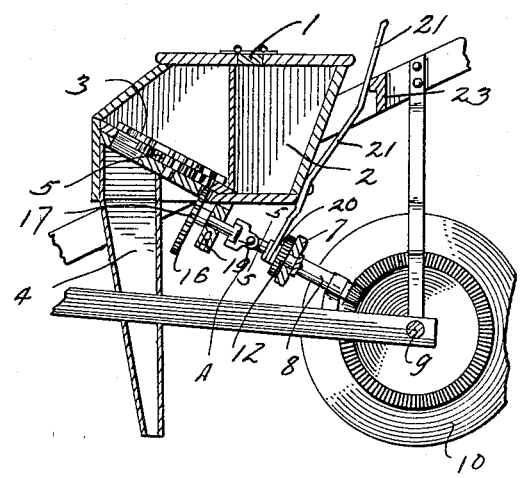
Witnesses
G. C. Walling.
R. A. Hartman.
Inventor
L. O. Drake
Attorney

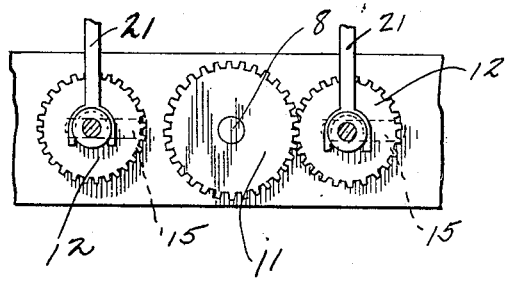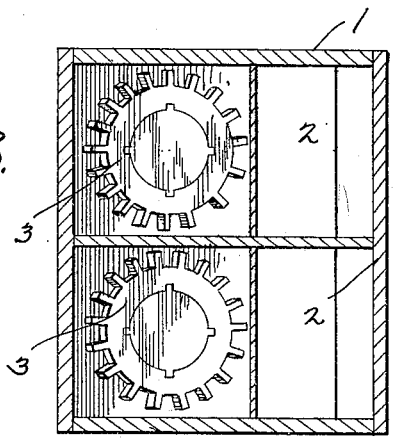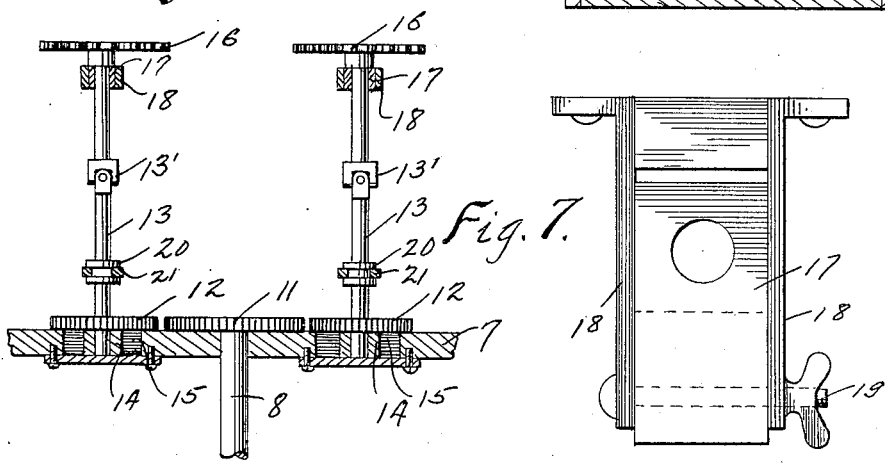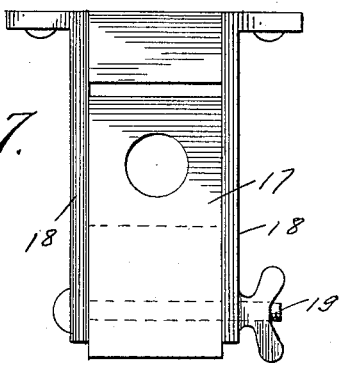

UNITED STATES PATENT OFFICE.

LINTON O. DRAKE, OF IRON CITY, GEORGIA.

GEARING FOR SEEDERS.

1,321,293.

Specification of Letters Patent.

Patented Nov. 11, 1919.

Application filed September 5, 1917. Serial No. 189,842.

*To all whom it may concern:*

Be it known that I, LINTON O. DRAKE, a citizen of the United States, residing at Iron City, in the county of Decatur, State of Georgia, have invented certain new and useful Improvements in Gearings for Seeders; and I do hereby declare the following to be a full, clear, and exact description of the invention, such as will enable others skilled in the art to which it appertains to make and use the same.

This invention relates to planters.

The object of the invention is to provide a planting machine by means of which two kinds of seed may be planted in a single row, the planting of the two kinds of seed being a selective proposition, so that one may plant two kinds of seed in one row and then cut off the supply of one kind of seed so as to plant only the remaining kind in a second row, thereby saving considerable labor in the planting of alternate rows, either with single seed or mixed seed. Thus, farmers frequently plant corn and beans in the same plot, but only plant the beans with the corn in every other row while corn is planted in every row. The present machine is intended to permit this selective planting so that by a single trip over the plot, the desired planting may be successively carried out.

With the above objects in view, and such others relating to the details of construction, as may hereinafter appear, my invention will now be fully set forth and described, reference being had to the accompanying drawings:—

In the drawings:—

Figure 1 is a side elevation,

Fig. 2 is a rear view,

Fig. 3 is a section on line 3—3 of Fig. 1,

Fig. 4 is a longitudinal section,

Fig. 5 is a section on line 5—5 of Fig. 4,

Fig. 6 is a detail section on line 6—6 of Fig. 1, and

Fig. 7 is a further enlarged detail view.

Referring more particularly to the drawings, 1 represents a hopper box which is longitudinally divided to provide two seed hoppers 2. In each of the seed hoppers 2 is mounted a seed distributing mechanism which includes a seed plate 3, arranged at an incline within the hopper so as to carry seeds from the rear portion thereof, over an inclined hopper bottom and to drop them into the seed spout 4. Carried upon the same axis with the seed plate 3 is a gear 5 by means of which the seed plate is rotated.

The parts above described are common to an old type of planter, except that they are arranged in duplicate in a pair of hoppers. Suspended from the rear portion of the hopper structure 1 is a frame 6 which includes a transverse cross piece 7. The cross piece 7, at its middle point is provided with a bearing opening, within which is rotatably suspended the upper end of a shaft 8 whose opposite end is geared to the shaft 9 of the supporting wheels 10. Above the cross piece 7, the shaft 8 is provided with a gear 11 which is adapted to be meshed with one or both of a pair of pinions 12.

The pinions 12 are fixed upon the lower ends of a pair of shafts 13 whose lower ends are journaled in slide blocks 14 which are transversely operable in guide slots 15 formed in the cross piece 7. The movement of the blocks 14 is such as to permit the engagement or disengagement of the gear pinions 12 with the gear wheel 11. The upper ends of the shafts 13 are also provided with pinions 16 which normally stand in mesh with the gear wheels 5 of the seed plates. Furthermore, the upper ends of the shafts 13 are supported in adjustable bearing blocks 17 which are supported between parallel plates 18, suspended from the bottom of the hopper structure 1. The blocks 17 are held into position by means of the bolts 19 which pass through the plates and also through slots formed in the blocks, so that the latter may be vertically adjusted in order to regulate the engagement of the gear wheels 16 with the gear wheels 5.

The shafts 13 are provided with universal joints 13′, so as to permit the former to rock to a slight degree transversely of their axis, to follow the movement of the slide blocks 14 within the slots 15.

Sleeved upon the shafts 13 are the collars 20, to which are connected the shifting rods 21, the latter extending then upwardly along the rear side of the hopper structure 1 to which they are intermediately pivoted for transverse movement whereby to slide the blocks 14 and throw the gears 12 into or out of mesh in selective manner with the gear wheel 11. Extending transversely across the handles 22, above the hopper structure 1 is a bar 23 which is notched where the rods 21 cross the bar so as to permit the locking of the bars in their positions of adjustment.

It will be apparent from the foregoing description that I have provided a very simple mechanism for planters by whose use two kinds of seed may be distributed in rows in selective manner, either by planting two kinds of seeds in one row and the seeds of another kind in the next row and so on in alternating order, or in planting seeds of one kind in alternate rows and seeds of another kind in alternate rows.

What I claim as my invention is:—

In a gearing for seeders, the combination with two gears adapted for the operation of separate seeding mechanisms, a support, two shafts journaled in the support, a gear carried by each shaft and meshing with one of the first mentioned gears, a second support parallel with the first mentioned support, a drive shaft journaled in the second support with its axis substantially parallel to and between the axes of the first mentioned shafts, a gear carried by the drive shaft, blocks slidably mounted in the second support at opposite sides of the drive shaft for movement toward and away from the drive shaft, shafts universally connected one with each of the first mentioned two shafts and journaled in the blocks and shiftable therewith toward and away from the drive shaft, a gear carried by each of the shiftable shafts and movable therewith into and out of meshing engagement with the gear of the drive shaft, and means for shifting each of the shiftable shafts.

In testimony whereeof, I affix my signature in the presence of two witnesses.

LINTON O. DRAKE.

Witnesses:
A. W. ALLDAY,
R. R. DAVIS.